US006058030A

United States Patent [19]
Hawkes et al.

[11] Patent Number: 6,058,030
[45] Date of Patent: *May 2, 2000

[54] MULTIPLE OUTPUT DC-TO-DC CONVERTER HAVING ENHANCED NOISE MARGIN AND RELATED METHODS

[75] Inventors: Charles E. Hawkes, Cary; Michael M. Walters, Raleigh; Thomas A. Jochum, Durham, all of N.C.

[73] Assignee: Intersil Corporation, Palm Bay, Fla.

[*] Notice: This patent issued on a continued prosecution application filed under 37 CFR 1.53(d), and is subject to the twenty year patent term provisions of 35 U.S.C. 154(a)(2).

[21] Appl. No.: 08/974,862

[22] Filed: Nov. 20, 1997

[51] Int. Cl.$^7$ .................... G05F 1/40; G05F 1/44; H02M 7/00
[52] U.S. Cl. .................. 363/65; 363/71; 323/268; 323/271; 323/285
[58] Field of Search ............... 363/65, 71; 323/225, 323/268, 350, 222, 271, 282, 285, 351

[56] References Cited

U.S. PATENT DOCUMENTS

| | | | |
|---|---|---|---|
| 4,062,057 | 12/1977 | Perkins et al. | 363/71 |
| 4,195,333 | 3/1980 | Hedel | 363/65 |
| 4,313,155 | 1/1982 | Bock et al. | 363/71 |
| 5,402,060 | 3/1995 | Erisman | 323/268 |
| 5,479,335 | 12/1995 | Saito et al. | 363/65 |
| 5,521,809 | 5/1996 | Ashley et al. | 363/71 |
| 5,550,729 | 8/1996 | Wissell | 363/65 |
| 5,793,191 | 8/1998 | Elmore et al. | 323/272 |
| 5,804,950 | 9/1998 | Hwang et al. | 363/89 |

*Primary Examiner*—Edward H. Tso
*Assistant Examiner*—Bao Q. Vu
*Attorney, Agent, or Firm*—Allen, Dyer, Doppelt, Milbrath & Gilchrist, P.A.

[57] ABSTRACT

A circuit includes a plurality of DC-to-DC converter circuits and separates in time switching of the respective power switches of the DC-to-DC converter circuits which would otherwise be switching at nearly a same time, such as based upon a same desired output level. The switching time may be separated by inverting a periodic control waveform of at least one of the DC-to-DC converter circuits. The multiple output DC-to-DC converter circuit thereby provides an increased noise margin and operates with greater accuracy and stability. The circuit may also determine when the DC-to-DC converter circuits would otherwise be switching at nearly the same time, and activate the switching time separation responsive thereto. For example, the determination may be made based upon a selectable output level being within a predetermined range of at least one other output level. The circuit in accordance with the invention is particularly advantageous for a single integrated circuit implementation, and may be used, for example, on a portable computer motherboard.

43 Claims, 4 Drawing Sheets

MULTIPLE OUTPUT DC-TO-DC CONVERTER HAVING ENHANCED NOISE MARGIN AND RELATED METHODS

FIELD OF THE INVENTION

The present invention relates to the field of power supplies, and, more particularly, to a circuit and related method for providing a plurality of direct current (DC) outputs.

BACKGROUND OF THE INVENTION

DC-to-DC power converters are widely used to supply power to electronic devices, such as in computers, printers, etc. Such DC-to-DC converters are available in a variety of configurations for producing a desired output voltage from a source voltage. For example, a buck or step down converter produces an output voltage that is less than the source voltage.

A typical step down converter includes a high-side power switch which is pulse width modulated by a control circuit to thereby periodically connect a source voltage to an inductor and capacitor. The voltage developed across the capacitor powers the load. In addition, the output voltage is typically sensed, such as by a voltage divider, and fed as one input to an error amplifier. A reference voltage is fed to a second input of the error amplifier. The output of the error amplifier feeds one input of a comparator. The other comparator input is typically fed by a periodic control waveform, such as a triangle wave. The comparator, in turn, operates the power switch with a series of control pulses, the width of which are used to regulate the load voltage to the desired level despite fluctuations in the load. It is, of course, desirable that the power conversion efficiency be relatively high, and that the desired output voltage be accurately maintained.

Modern computer systems, for example, may require multiple DC power supplies. For example, the microprocessor core of a portable computer may require a separate and different supply voltage than other circuit portions. Accordingly, for such applications, several DC-to-DC converters having pulse modulation control as described above may be combined into a single circuit, and, more preferably, into a single integrated circuit. In addition, at certain times or for certain applications, two converters may need to deliver similar output voltages.

Unfortunately, if two PWM DC-to-DC converters are used in the same system, such as in the same integrated circuit or on the same circuit board, for example, it is possible for these converters to interact in a way that results in noisy or jittery operation of each of the converters. This may typically occur when the two converters are operating at nearly the same duty cycle. Under this condition, the power switch of one converter will turn on or off at a time that immediately precedes the turn-on or turn-off of the power switch of the other converter. When the first converter switches, noise is induced into the control circuitry of the second converter. This may result in the second converter switching prematurely. When the second converter switches prematurely, this may cause too much or too little output voltage to be generated, and the control circuitry will respond by further decreasing or increasing the duty cycle of the power switch. This sets up a jitter in the pulse width of the second converter.

Generally, the second converter will also interfere with the operation of the first converter, as well. The two converters may appear to lock to the same jittery duty cycle. The resulting operation causes undesirable noise, and, if the amplitude of the jitter is large enough, there may also be a large, low-frequency oscillation in the output voltages of the converters.

The problem with respect to mutual interference and jitter may be particularly pronounced when the error amplifier, comparator and triangle waveform generator for the two or more converters are integrated into a single integrated circuit. In particular, this may be a problem on a personal computer motherboard, which typically requires the generation of a fixed 3.3 V supply for the input/output (I/O) circuits, as well as a variable 1.3 to 3.5 V supply for the core of the microprocessor. If the adjustable core voltage is set to be relatively near the 3.3 V supply, then jitter may likely occur.

In the past, attempts have been made to address the jitter problem for multiple co-located PWM DC-to-DC converters by reducing the amount of noise coupled to the respective control circuits of the converters. This has been done by using separate grounds and power supplies for the two control circuits. Unfortunately, this approach is limited because there is always some noise coupled between the two control circuits, especially when they are on the same IC. This prior art approach also has the drawbacks of requiring extra power supply pins for the IC, and requiring extra decoupling capacitors. In addition, this prior approach is not always effective in removing jitter.

SUMMARY OF THE INVENTION

In view of the foregoing background, it is therefore an object of the present invention to provide a circuit and related method for delivering a plurality of DC outputs, and wherein the individual DC-to-DC converter circuits are less likely to detrimentally interact with one another.

It is another object of the present invention to provide a circuit and related method for delivering a plurality of DC outputs without requiring additional pins, decoupling capacitors, and/or separate and isolated power supply connections for the DC-to-DC converter circuits.

These and other objects, features and advantages in accordance with the present invention are provided by a circuit for generating a plurality of DC outputs comprising switching time separating means for separating in time switching of the power switches of the DC-to-DC converter circuits when they would otherwise be switching at or nearly at the same time. The switching time separating means may be provided by an inverter for inverting a periodic control waveform for at least one of the DC-to-DC converter circuits relative to the periodic control waveform of at least one other circuit. The present invention thereby provides an increased noise margin for the DC-to-DC converter circuits.

The circuit may also include determining means for determining when the DC-to-DC converter circuits would otherwise be switching within a predetermined time of each other and activating means for activating the switching time separating means responsive to determining that the DC-to-DC converter circuits would otherwise be switching at nearly the same time. For example, at least one of the DC-to-DC converter circuits may have a selectable output level. Accordingly, the determining means may determine if the selectable output level is within a predetermined range of at least one other output level.

Each of the DC-to-DC converter circuits preferably comprises a periodic waveform generator, at least one power switch, and a control circuit for controlling a duty cycle of the power switch based upon the periodic control waveform and a desired respective output level. Of course, the output voltage is also preferably sensed and used to further control the output voltage. More particularly, each of the control circuits preferably includes an error amplifier for generating an error signal based upon the sensed output voltage signal, and a reference signal related to the desired output level; and a comparator for generating a control output for the power switch bases upon the error signal and the periodic control waveform, such as a triangular waveform derived from a clock signal. The comparator may have an input operatively connected to either the periodic control waveform, or to an inverted version of the waveform. The circuit in accordance with the invention is particularly advantageous for a single integrated circuit implementation.

A method aspect of the invention is for generating a plurality of DC outputs using a plurality of DC-to-DC converter circuits, each comprising at least one power switch and a control circuit for controlling a duty cycle of the power switch. The method preferably comprises the steps of: controlling the duty cycle of the DC-to-DC converters; and separating in time switching of the power switches of the DC-to-DC converter circuits to thereby provide an increased noise margin for the plurality of DC-to-DC converter circuits. The step of separating switching preferably comprises inverting a periodic control waveform for at least one of the DC-to-DC converter circuits relative to at least one other converter circuit. The method also preferably includes the steps of determining when at least two of the plurality of DC-to-DC converter circuits would otherwise be switching at or nearly at the same time; and activating the separating in time switching responsive to determining that at least two of the plurality of DC-to-DC converter circuits would otherwise be switching at nearly the same time. The step of determining preferably comprises determining if a selectable output level of at least one DC-to-DC converter circuit is within a predetermined range of at least one other output level.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
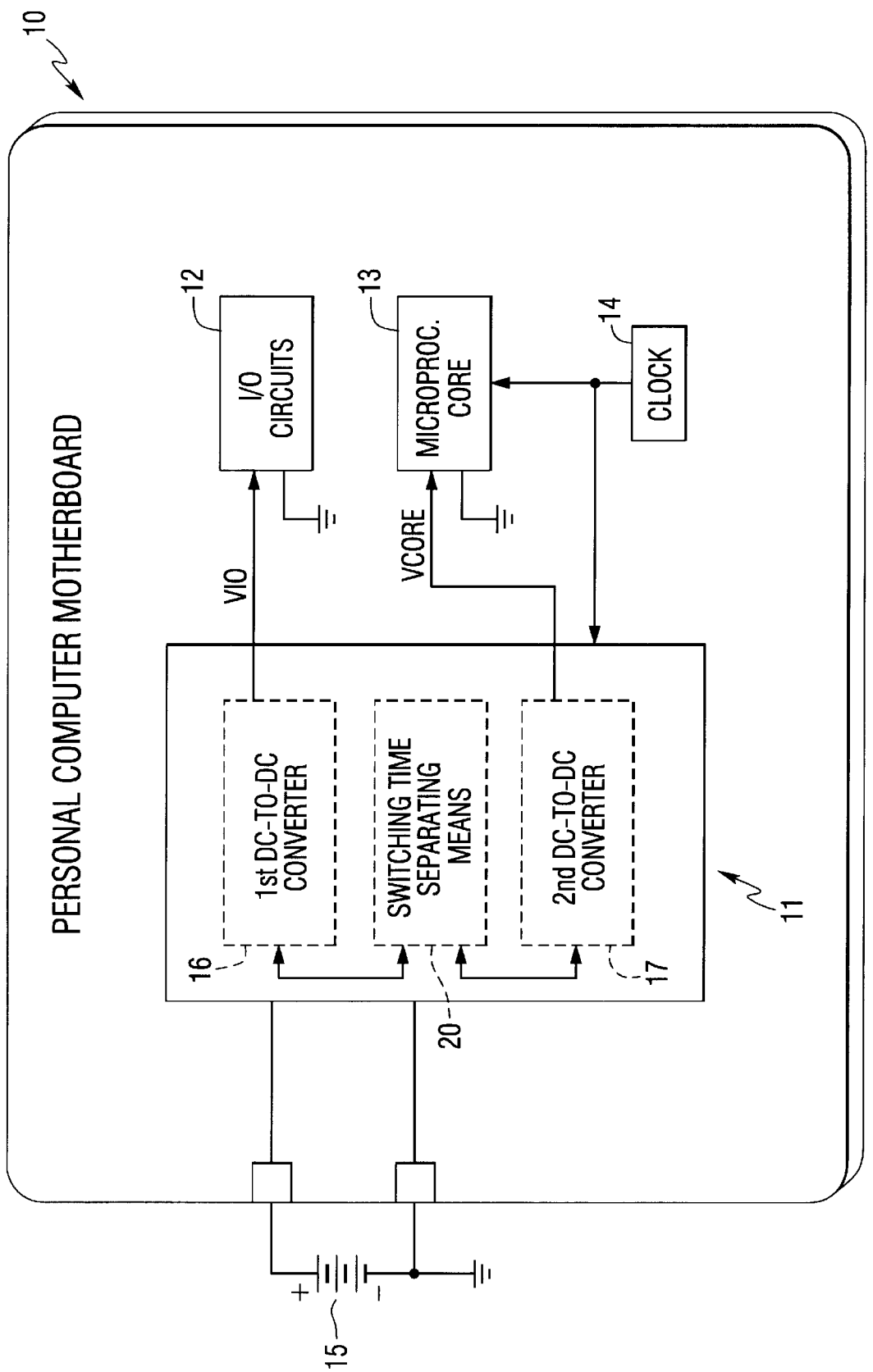
FIG. 1 is a schematic block diagram of a personal computer motherboard including the DC-to-DC converter circuit having a plurality of DC outputs in accordance with the present invention.

Referring to FIG. 1, the multiple output DC-to-DC converter circuit 11 is initially described. As illustrated in FIG. 1, the circuit 11 can be used, for example, on a personal computer motherboard 10. The motherboard 10 also illustratively includes I/O circuits 12 and a microprocessor core 13, each requiring a separate DC supply, VIO and VCORE, respectively. A clock 14 may also be included for the microprocessor core 13 and the multiple output DC-to-DC converter circuit 11. A battery 15 provides the source voltage for the converter circuit 11. The multiple output DC-to-DC converter circuit 11 may be used in many other applications as will be readily understood by those skilled in the art.

The multiple output DC-to-DC converter circuit 11 includes a first DC-to-DC converter 16, and a second DC-to-DC converter 17 which deliver a pair of DC outputs, VIO and VCORE, respectively, in the illustrated embodiment. The multiple output converter circuit 11 also includes switching time separating means 20 for separating switching of the DC-to-DC converter circuits 16, 17 in time when the converter circuits would otherwise be switching at nearly a same time as described in greater detail below. The present invention configures and operates the DC-to-DC converter circuits 16, 17 so that they are less likely to detrimentally interact with one another. Those of skill in the art will recognize that more than two such DC-to-DC converter circuits may also be combined and simultaneously operated in accordance with the present invention.

Figure 2:
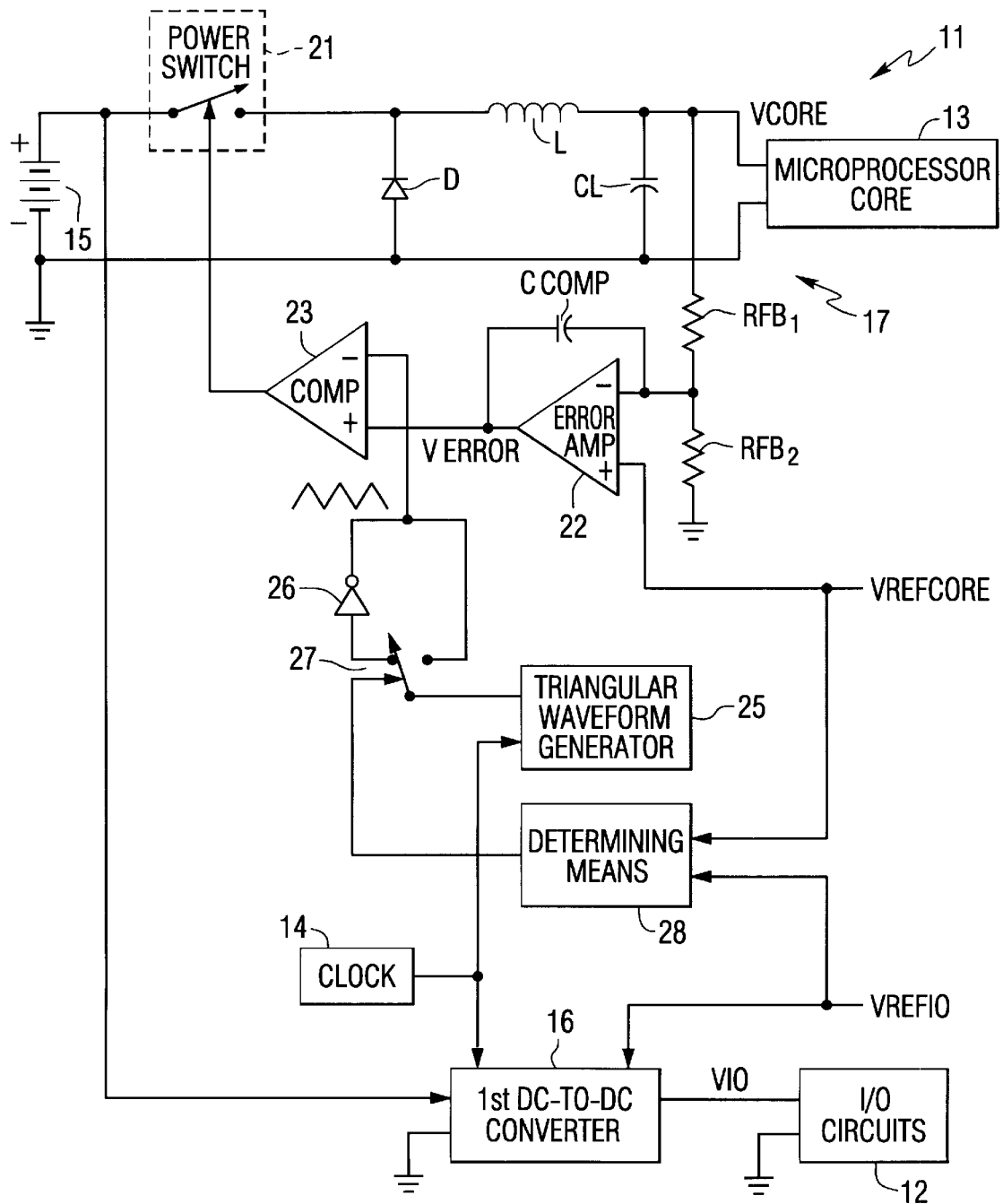
FIG. 2 is a schematic block diagram of an integrated circuit embodiment of the multiple output DC-to-DC converter circuit as shown in FIG. 1.

Referring now additionally to FIG. 2, further details of the multiple output DC-to-DC converter circuit 11 are now described. For ease of understanding, the second DC-to-DC converter circuit 17 is illustrated in greater detail and described, and those of skill in the art will appreciate that the DC-to-DC first converter circuit 16 includes similar circuit portions. The second DC-to-DC converter circuit 17 is connected to the source, which in the illustrated embodiment is the battery 15, which may, for example, be a rechargeable battery for a portable computer. The second circuit 17 includes a power switch 21 which supplies current through the inductor L and load capacitor CL. The illustrated diode D operates in a conventional manner as will be readily understood by those skilled in the art. The output voltage VIO across the output capacitor CL is connected to the illustrated microprocessor core 13.

The second DC-to-DC converter circuit 17 also includes a pulse width modulation (PWM) control circuit for controlling the power switch 21 to maintain the output voltage VCORE at the desired level, despite fluctuations in the load. The control circuit includes output voltage sensing means for sensing an output voltage and generating a sensed output voltage signal. In the illustrated embodiment, the output voltage is sensed by a voltage divider provided by the feedback resistors RFB1, RFB2. An error amplifier 22 generates an error signal based upon the sensed output voltage signal, and a reference signal VREFCORE related to the desired output level. A capacitor CCOMP is connected across the output of the error amplifier 22 and the inverting input of thereof. A comparator 23 generates control output pulses for the power switch 21 based upon the error signal VERROR and the illustrated periodic triangular control waveform. The illustrated triangular waveform generator 25 generates the triangular waveform based upon the clock signal from the clock 14 as will be appreciated by those skilled in the art. The operation of the second DC-to-DC converter circuit 17 portions described thus far will be readily appreciated by those skilled in the art. In addition, the first DC-to-DC converter circuit 16 includes similar circuit portions as will be readily understood by those of skill in the art without further discussion.

Unfortunately, as described in the Background of the Invention section, combining multiple DC-to-DC converter circuits 16, 17 may result in undesirable jitter in the control circuits when the switching of one converter circuit occurs at or near the same time as the other converter. The problem may be particularly pronounced for a monolithic or integrated circuit embodiment when the error amplifiers, comparators, and triangular waveform generators for the converter circuits 16, 17 are on the same substrate. Prior art attempts, to decrease coupling between the multiple converter circuits typically required separate ground and supply connections, which, in turn, also required additional pins and decoupling capacitors. In addition, such approaches have not been entirely satisfactory in reducing jitter. Accordingly, the present invention provides switching time separating means 20 for increasing a noise margin for the converter circuits 16, 17 so that they operate accurately.

The switching time separating means 20 in the illustrated embodiment of FIG. 2 is provided by the inverter 25 which inverts the periodic triangular control waveform. The noise margin is increased, the pin count need not be increased, and the same supply and ground buses may be used in accordance with some of the advantages of the present invention.

If the two converter circuits 16, 17 will be required to operate at fixed corresponding output levels that causes close switching times, the inverter 26 may be permanently connected in the path of the triangular waveform generator 25. However, one or more the output levels, may typically be selectable, such as, for example, the output VCORE may be selectable. For example, for a typical portable computer motherboard 10, the I/O circuits 12 may require a fixed 3.3 V supply VIO. The microprocessor core 13 may require a variable or adjustable 1.3 to 3.5 V supply VCORE. Thus, if VCORE is set near 3.3 V, then jitter may occur.

Accordingly, another important aspect of the invention is that the inverter 25 may be selectively connected in the path of the triangular waveform generator 25 to the comparator 23 based upon a comparison of the desired output levels of the DC-to-DC converter circuits 16, 17. In other words, the circuit 11 preferably also includes determining means 28 for determining when the DC-to-DC converter circuits 16, 17 would otherwise be switching at or nearly at the same time, and activating means for activating the switching time separating means responsive to the determining means 28. In the illustrated embodiment, the activating means is provided by the schematically illustrated switch 27 for connecting the inverter 25 into the circuit or bypassing the inverter based on the likelihood of interference between the two converter circuits 16, 17. The determining means 28 may determine if the desired output levels are within a predetermined range of each other, such as by comparing the two references, VREFCORE and VREFIO. Of course, those of skill in the art will appreciate that other signals may also be compared to determine if the switching transitions of the power switches would otherwise occur at similar instants.

Figure 3:
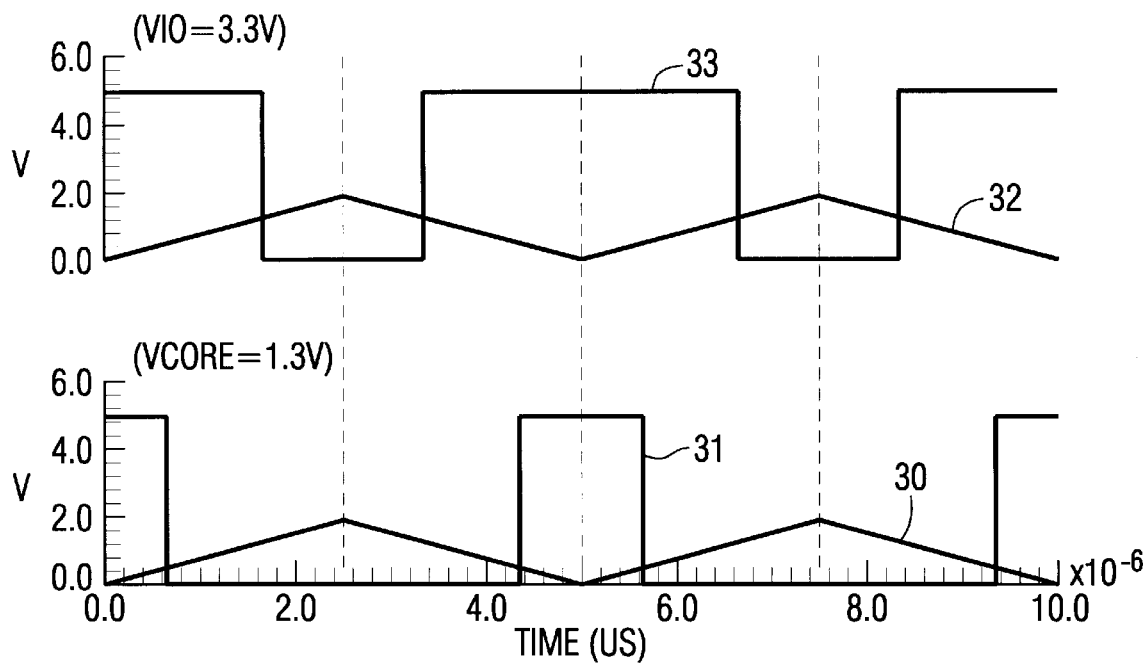
FIG. 3 is a timing diagram of simulated operation of the multiple output DC-to-DC converter circuit of FIG. 1 with the two converters operating at different output voltages.
Figure 4:
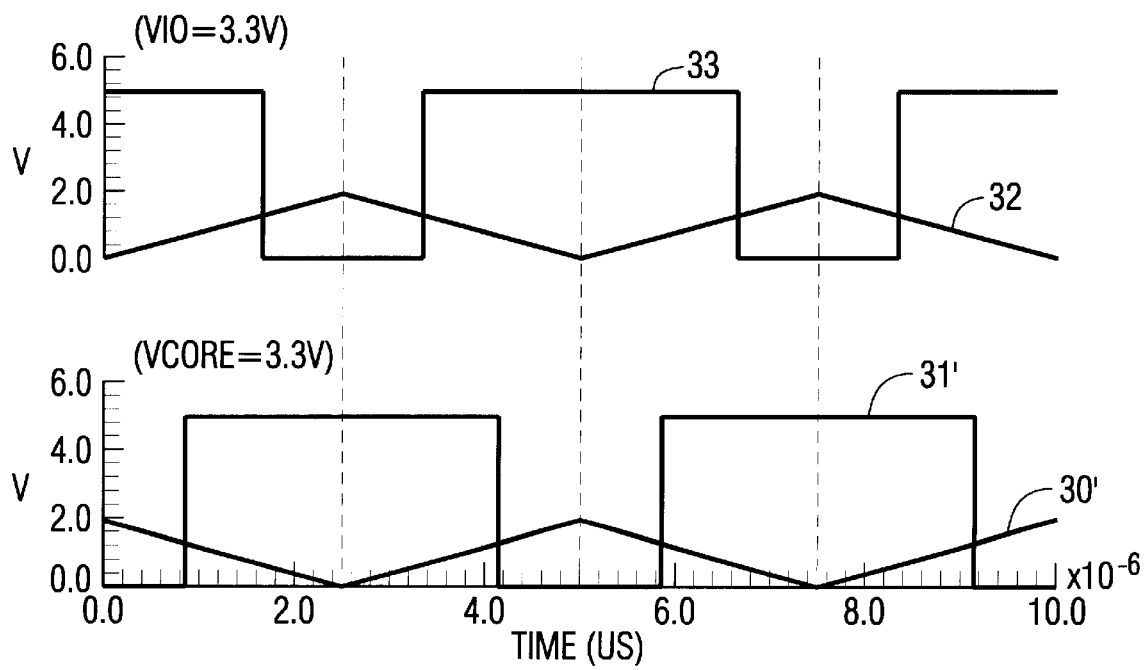
FIG. 4 is a timing diagram of simulated operation of the multiple output DC-to-DC converter circuit of FIG. 1 with the two converters operating at same output voltages.

Further understanding of the features and advantages of the present invention may be understood with additional reference to FIGS. 3 and 4 which show simulated results of the invention. In FIG. 3, the lower triangular waveform 30 is that produced by the triangular waveform generator 25 of the second DC-to-DC converter circuit 17 operating at an output level VCORE of 1.3 V. The lower series of pulses 31 illustrate the control pulses output from the comparator 23 to the power switch 21. As can be seen, each pulse 31 is centered about the valley of the triangular waveform 30 based upon the configuration of the control circuit and as will be appreciated by those skilled in the art. The upper plots are for the first DC-to-DC converter 16 operating at 3.3 V for VIO, and include a triangular waveform 32 and a series of control pulses 33. As can be readily seen and appreciated, when the two converters 16, 17 are operating at different output levels, the switching of the respective power switches are offset in time from one another.

As shown in FIG. 4, the upper plots are the same with the triangular waveform 32 and the control pulses 33 being for the first DC-to-DC converter 16 set to provide a 3.3 V output level VIO. In the lower portion of the figure, the triangular waveform 30' of the second DC-to-DC converter circuit 17 has been inverted by the inverter 26. The control pulses 31' are thus correspondingly shifted in time about 2.4 μsec., equal to a 180 degree phase shift, relative to where they would otherwise be. Accordingly, the transitions of the power switches for the converters 16, 17 are moved relative to one another so that they are not occurring at exactly or near the same time.

Figure 5:
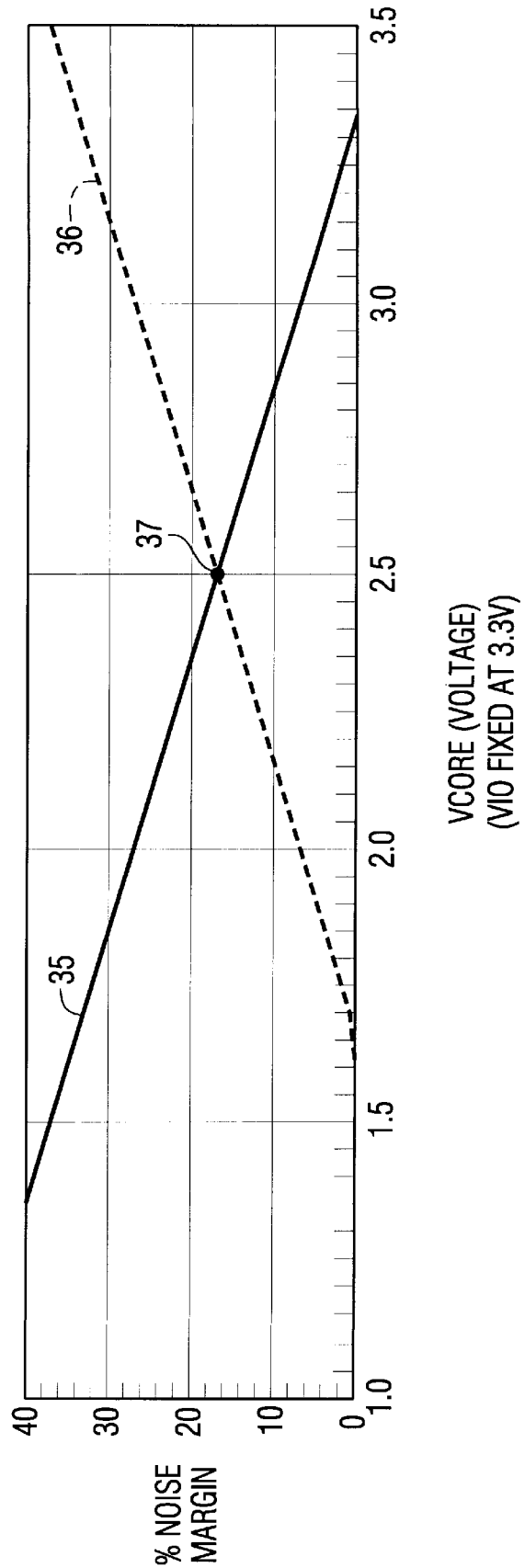
FIG. 5 is a graph of percentage noise margin versus operating voltage, for both an unadjusted configuration and an adjusted configuration of the multiple output DC-to-DC converter circuit in accordance with the present invention.

Turning now additionally to FIG. 5, the improvement in noise margins obtainable by the present invention is described. The percent noise margin at the input of the comparators versus the output VCORE of the second converter circuit 17 is plotted by the solid line 35 for the normal, non-inverted operation, and by the dashed line 36 for the inverted or flipped operation. As can be readily determined from the plots, the two plots define a cross-over point 37 which occurs at about 2.5 V for the output VCORE of the second converter 17. At the cross-over point 37, the determining means 28 would desirably be set to switch the inverter 26 into the circuit so that the noise margin will remain relatively high as VCORE increases. In other words, the inverted operation yields a superior noise margin when VCORE is greater than or equal to about 2.5 V.

The multiple output DC-to-DC converter circuit 11 in accordance with the present invention may be implemented in integrated circuit form, or as separate discrete circuit components in other embodiments. In addition, many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A circuit for generating a plurality of direct current (DC) outputs comprising:
   a plurality of DC-to-DC converter circuits, each comprising at least one power switch and a control circuit for controlling a duty cycle of the at least one power switch based upon a periodic control waveform, the control circuits generating periodic control waveforms capable of causing the power switches to be switching at a substantially same time;
   determining means for determining when the respective power switches of said plurality of DC-to-DC converter circuits would otherwise be switching within a predetermined time of each other;
   switching time separating means for separating in time switching of the respective power switches of said plurality of DC-to-DC converter circuits by setting at least one periodic control waveform to be different than at least one other periodic control waveform to thereby provide an increased noise margin for said plurality of DC-to-DC converter circuits; and activating means for selectively activating said switching time separating means responsive to said determining means determining that the respective power switches of said plurality of DC-to-DC converter circuits would otherwise be switching within the predetermined time of each other.

2. A circuit according to claim 1 wherein at least one of said DC-to-DC converter circuits has a selectable output level; and wherein said determining means comprises means for determining if the selectable output level is within a predetermined range of at least one other output level.

3. A circuit according to claim 1 wherein said switching time separating means comprises an inverter for inverting the periodic control waveform of the at least one DC-to-DC converter circuit.

4. A circuit according to claim 1 wherein each of said control circuits comprises:

a periodic waveform generator for generating the periodic control waveform from a clock signal;

output voltage sensing means for sensing an output voltage and generating a sensed output voltage signal;

an error amplifier for generating an error signal based upon the sensed output voltage signal and a reference signal related to the desired output level; and a comparator for generating control output pulses for said at least one power switch based upon the error signal and the periodic control waveform.

5. A circuit according to claim 4 wherein said periodic control waveform generator comprises a triangle waveform generator.

6. A circuit according to claim 5 wherein said triangle waveform generator comprises means for generating a triangle waveform having a predetermined frequency; and wherein the frequencies of all of said triangle waveform generators are the same.

7. A circuit according to claim 1 wherein said plurality of DC-to-DC converter circuits and said switching time separating means are formed in an integrated circuit.

8. A circuit according to claim 1 further comprising common ground and power supply connections for said plurality of DC-to-DC converter circuits.

9. A circuit according to claim 1 wherein at least one of said plurality of DC-to-DC converter circuits has a selectable output level.

10. A circuit for generating a plurality of direct current (DC) outputs comprising:

a plurality of DC-to-DC converter circuits, each comprising at least one power switch and a control circuit for controlling a duty cycle of the at least one power switch based upon a periodic control waveform, the control circuits generating periodic control waveforms capable of causing the power switches to be switching at a substantially same time;

determining means for determining when the respective power switches of said plurality of DC-to-DC converter circuits would otherwise be switching within a predetermined time of each other; and switching time separating means for separating in time switching of the respective power switches of said plurality of DC-to-DC converter circuits by setting at least one periodic control waveform to be different than at least one other periodic control waveform responsive to said determining means determining that the respective power switches of said plurality of DC-to-DC converter circuits would otherwise be switching within the predetermined time of each other.

11. A circuit according to claim 10 wherein at least one of said DC-to-DC converter circuits has a selectable output level; and wherein said determining means comprises means for determining if the selectable output level is within a predetermined range of at least one other output level.

12. A circuit according to claim 10 wherein said switching time separating means comprises an inverter for inverting the periodic control waveform of the at least one DC-to-DC converter circuit.

13. A circuit according to claim 10 wherein each of said control circuits comprises:

a periodic waveform generator for generating the periodic control waveform from a clock signal;

output voltage sensing means for sensing an output voltage and generating a sensed output voltage signal;

an error amplifier for generating an error signal based upon the sensed output voltage signal and a reference signal related to the desired output level; and a comparator for generating control output pulses for said at least one power switch based upon the error signal and the periodic control waveform.

14. A circuit according to claim 13 wherein said periodic control waveform generator comprises a triangle waveform generator.

15. A circuit according to claim 14 wherein said triangle waveform generator comprises means for generating a triangle waveform having a predetermined frequency; and wherein the frequencies of all of said triangle waveform generators are the same.

16. A circuit according to claim 10 wherein said plurality of DC-to-DC converter circuits and said switching time separating means are formed in an integrated circuit.

17. A circuit according to claim 10 further comprising common ground and power supply connections for said plurality of DC-to-DC converter circuits.

18. A circuit according to claim 10 wherein at least one of said plurality of DC-to-DC converter circuits has a selectable output level.

19. A circuit for generating a plurality of direct current (DC) outputs comprising:

a plurality of DC-to-DC converter circuits, each comprising at least one power switch and a control circuit for controlling a duty cycle of the at least one power switch, the control circuits generating periodic control waveforms capable of causing the power switches to be switching at a substantially same time;

determining means for determining when the respective power switches of said plurality of DC-to-DC converter circuits would otherwise be switching within a predetermined time of each other;

switching time separating means for separating in time switching of the respective power switches of said plurality of DC-to-DC converter circuits; and activating means for selectively activating said switching time separating means responsive to said determining means determining that the respective power switches of said plurality of DC-to-DC converter circuits would otherwise be switching within the predetermined time of each other.

20. A circuit according to claim 19 wherein at least one of said DC-to-DC converter circuits has a selectable output level; and wherein said determining means comprises means for determining if the selectable output level is within a predetermined range of at least one other output level.

21. A circuit according to claim 19 wherein said switching time separating means comprises an inverter for inverting the periodic control waveform of the at least one DC-to-DC converter circuit.

22. A circuit according to claim 19 wherein each of said control circuits comprises:
   a periodic waveform generator for generating the periodic control waveform from a clock signal;
   output voltage sensing means for sensing an output voltage and generating a sensed output voltage signal;
   an error amplifier for generating an error signal based upon the sensed output voltage signal and a reference signal related to the desired output level; and
   a comparator for generating control output pulses for said at least one power switch based upon the error signal and the periodic control waveform.

23. A circuit according to claim 22 wherein said periodic control waveform generator comprises a triangle waveform generator.

24. A circuit according to claim 23 wherein said triangle waveform generator comprises means for generating a triangle waveform having a predetermined frequency; and wherein the frequencies of all of said triangle waveform generators are the same.

25. A circuit according to claim 19 wherein said plurality of DC-to-DC converter circuits and said switching time separating means are formed in an integrated circuit.

26. A circuit according to claim 19 further comprising common ground and power supply connections for said plurality of DC-to-DC converter circuits.

27. A circuit according to claim 19 wherein at least one of said plurality of DC-to-DC converter circuits has a selectable output level.

28. A circuit board comprising:
   a plurality of loads; and
   a plurality of DC-to-DC converter circuits connected to respective loads, each DC-to-DC converter circuit comprising at least one power switch and a control circuit for controlling a duty cycle of the at least one power switch, the control circuits generating periodic control waveforms capable of causing the power switches to be switching at a substantially same time;
   determining means for determining when the respective power switches of said plurality of DC-to-DC converter circuits would otherwise be switching within a predetermined time of each other;
   switching time separating means for separating in time switching of the respective power switches of said plurality of DC-to-DC converter circuits; and
   activating means for selectively activating said switching time separating means responsive to said determining means determining that the respective power switches of said plurality of DC-to-DC converter circuits would otherwise be switching within the predetermined time of each other.

29. A circuit board according to claim 28 wherein said plurality of loads comprises at least one of an input/output circuit, and a microprocessor core.

30. A circuit board according to claim 28 wherein at least one of said DC-to-DC converter circuits has a selectable output level; and wherein said determining means comprises means for determining if the selectable output level is within a predetermined range of at least one other output level.

31. A circuit board according to claim 28 wherein said switching time separating means comprises an inverter for inverting the periodic control waveform of the at least one DC-to-DC converter circuit.

32. A circuit board according to claim 28 wherein each of said control circuits comprises:
   a periodic waveform generator for generating the periodic control waveform from a clock signal;
   output voltage sensing means for sensing an output voltage and generating a sensed output voltage signal;
   an error amplifier for generating an error signal based upon the sensed output voltage signal and a reference signal related to the desired output level; and
   a comparator for generating control output pulses for said at least one power switch based upon the error signal and the periodic control waveform.

33. A circuit board according to claim 32 wherein said periodic control waveform generator comprises a triangle waveform generator.

34. A circuit board according to claim 33 wherein said triangle waveform generator comprises means for generating a triangle waveform having a predetermined frequency; and wherein the frequencies of all of said triangle waveform generators are the same.

35. A circuit board according to claim 28 wherein said plurality of DC-to-DC converter circuits and said switching time separating means are formed in an integrated circuit.

36. A circuit board according to claim 28 further comprising common ground and power supply connections for said plurality of DC-to-DC converter circuits.

37. A circuit board according to claim 28 wherein at least one of said plurality of DC-to-DC converter circuits has a selectable output level.

38. A method for generating a plurality of direct current (DC) outputs using a plurality of DC-to-DC converter circuits, each comprising at least one power switch and a control circuit for controlling a duty cycle of the respective at least one power switch, the method comprising the steps of:
   controlling duty cycles of the respective power switches of the plurality of DC-to-DC converters, the control circuits generating periodic control waveforms capable of causing the power switches to be switching at a substantially same time;
   determining when at least two of the plurality of DC-to-DC converter circuits would otherwise be switching within a predetermined time of each other; and
   separating in time switching of the respective power switches of the plurality of DC-to-DC converter circuits responsive to determining that the respective power switches of the plurality of DC-to-DC converter circuits would otherwise be switching within the predetermined time of each other.

39. A method according to claim 38 wherein at least one of the DC-to-DC converter circuits has a selectable output level; and wherein the step of determining comprises determining if the selectable output level is within a predetermined range of at least one other output level.

40. A method according to claim 38 wherein the step of separating switching comprises inverting a periodic control waveform of at least one of the DC-to-DC converter circuits.

41. A method according to claim 38 further comprising the steps of:
   generating a periodic control waveform;
   sensing an output voltage and generating a sensed output voltage signal;
   generating an error signal based upon the sensed output voltage signal and a reference signal related to the desired output level; and
   generating control output pulses for the at least one power switch based upon the error signal and the periodic control waveform.

42. A method according to claim 41 further comprising the step of generating the periodic control waveform as a triangle waveform having a predetermined frequency.

43. A method according to claim 38 further comprising the step of sharing common ground and power supply connections for the plurality of DC-to-DC converter circuits.

* * * * *